United States Patent Office 3,445,140
Patented May 20, 1969

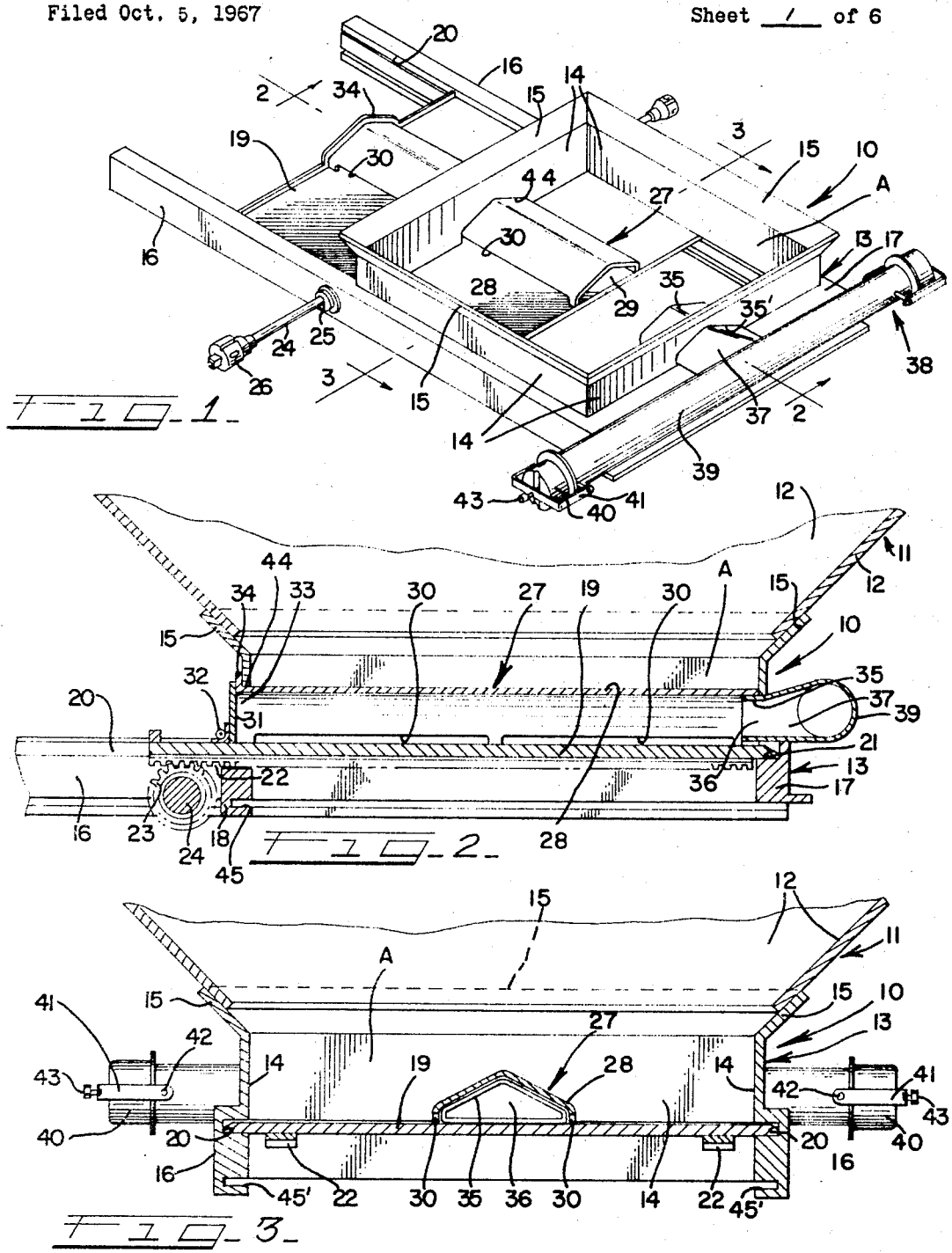
May 20, 1969     E. J. NAGY     3,445,140
COMBINATION PNEUMATIC AND GRAVITY DISCHARGE GATE FOR HOPPERS
Filed Oct. 5, 1967
INVENTOR
ERNEST J. NAGY
BY Edward O. Vogel
ATT'Y.

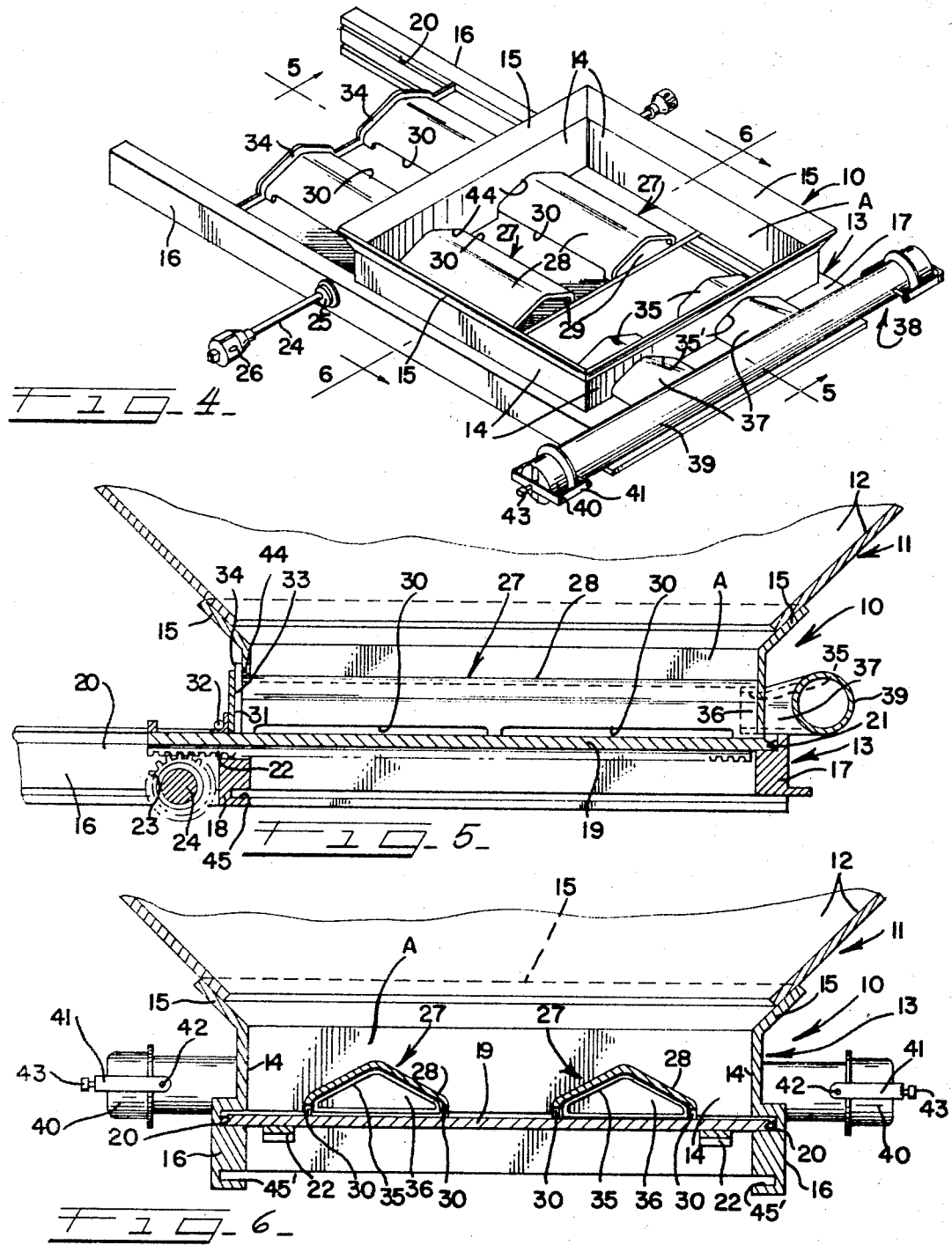

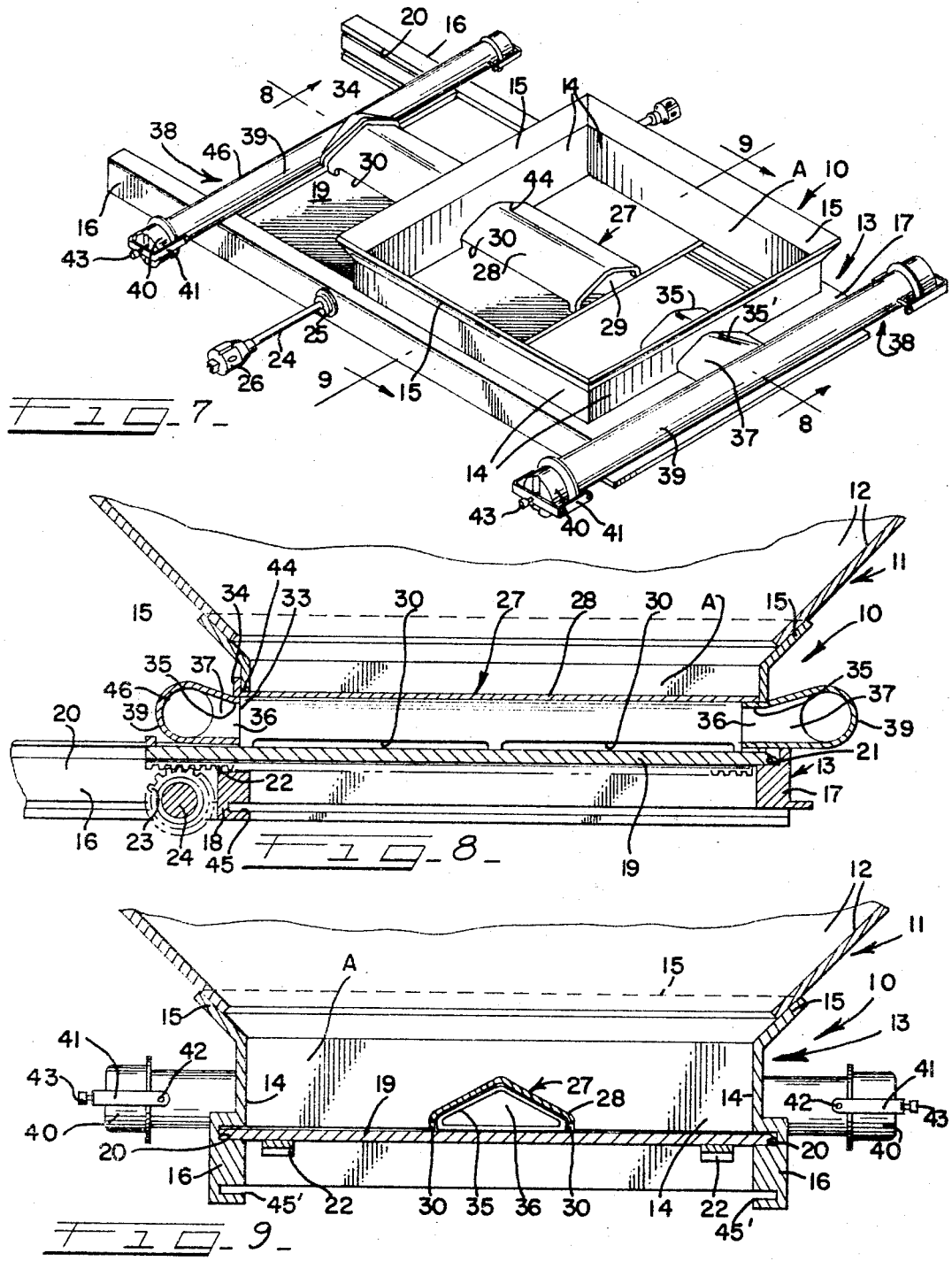

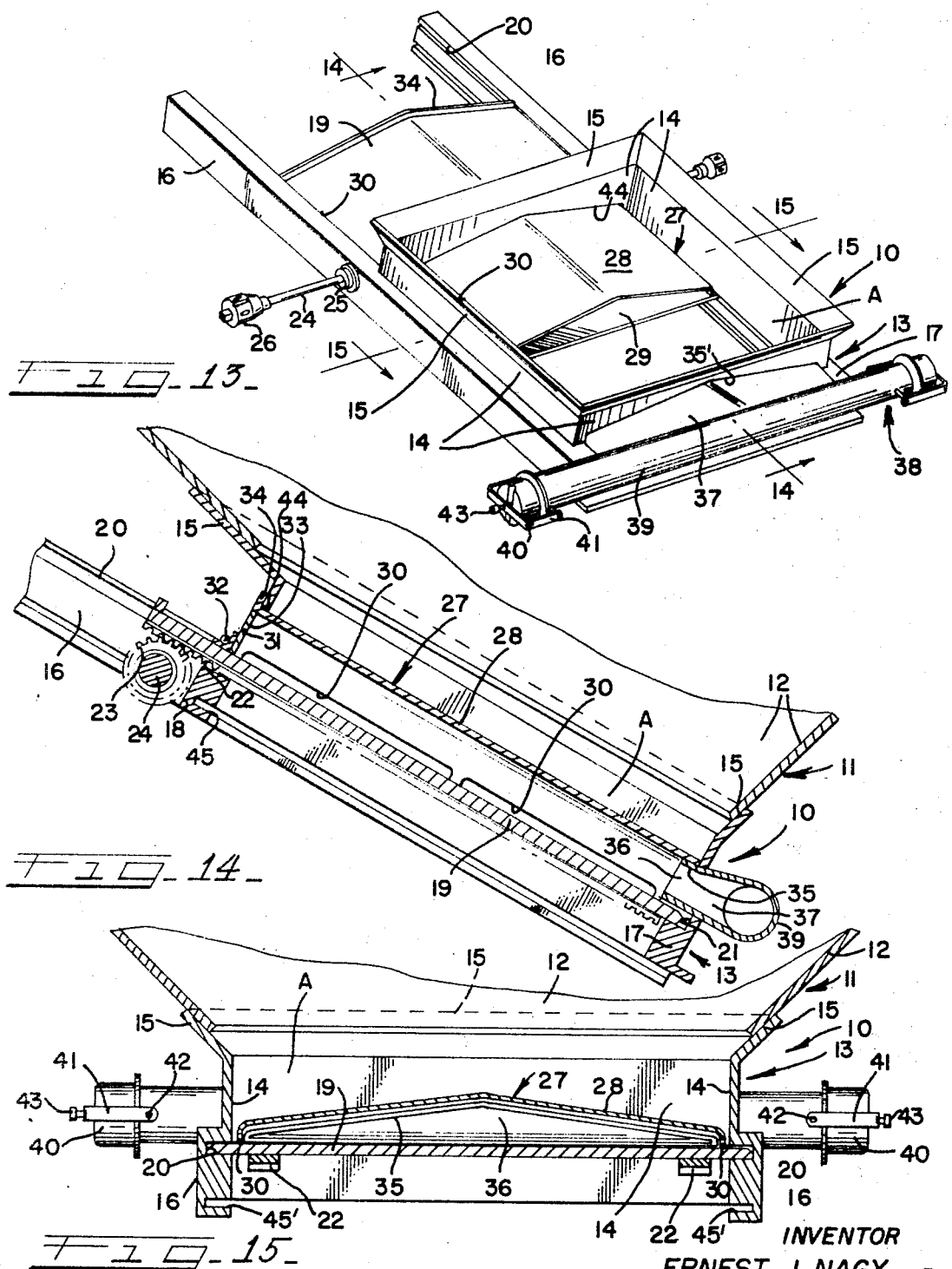

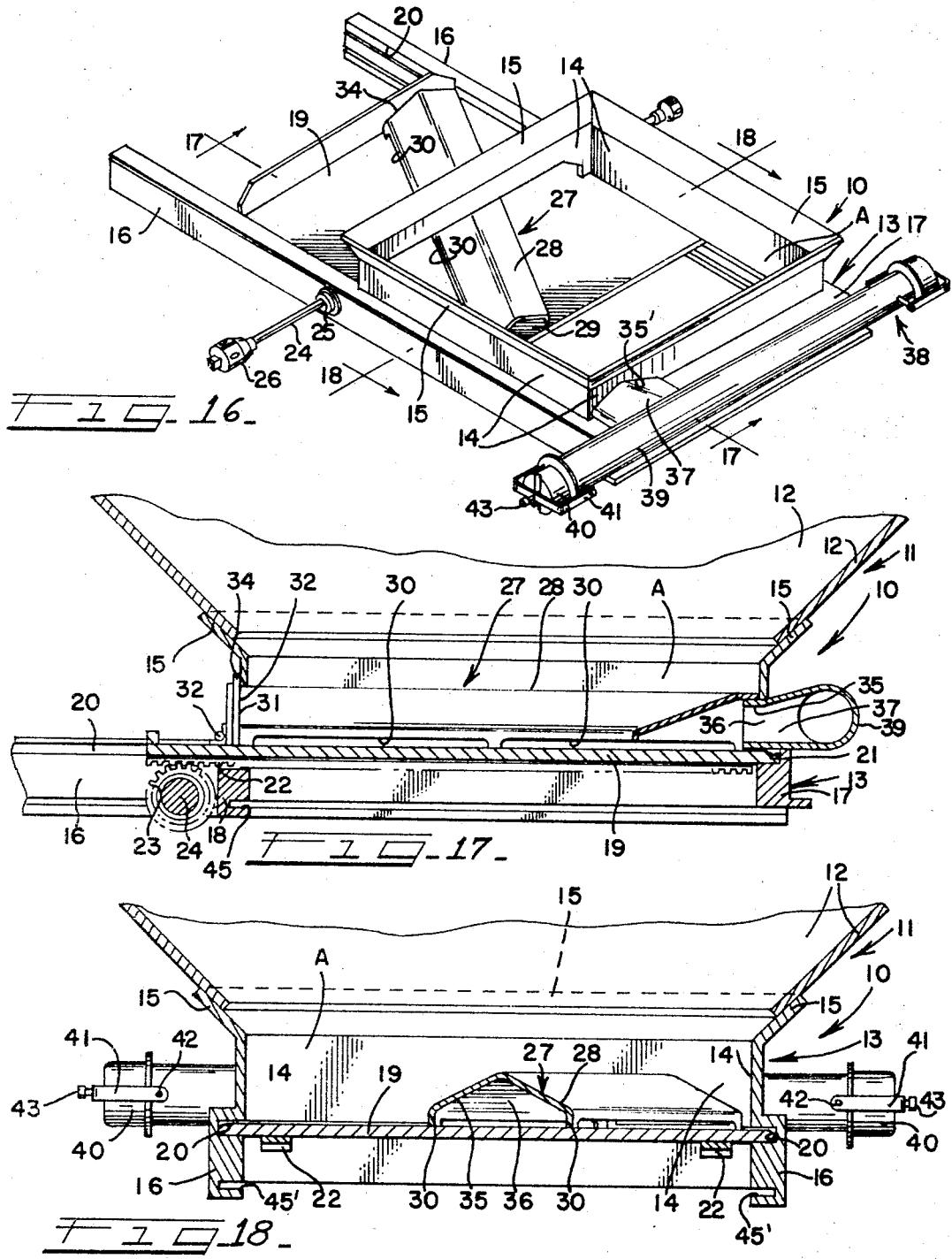

3,445,140
COMBINATION PNEUMATIC AND GRAVITY DISCHARGE GATE FOR HOPPERS
Ernest John Nagy, Munster, Ind., assignor to Pullman Incorporated, Chicago, Ill., a corporation of Delaware
Filed Oct. 5, 1967, Ser. No. 673,194
Int. Cl. B65g 53/40, 53/58
U.S. Cl. 302—52       18 Claims

ABSTRACT OF THE DISCLOSURE

A combination pneumatic and gravity discharge gate for hoppers including a frame which has supported thereon a four-walled framework connected to the discharge end of a hopper to provide a discharge chamber. A gate is slidably supported on the frame to close the discharge chamber with the gate having positioned thereon a pneumatic hood which in the closed position is connected to an air and material exhaust conduit for withdrawing and discharging material from the chamber. The hood and gate are movable to an open position wherein the hood is completely displaced outwardly of the discharge chamber and material from the hopper may be discharged through the chamber by gravity.

BACKGROUND OF THE INVENTION

Field of the invention

The field of the invention has to do with discharge devices for material hoppers. The hoppers may be stationary, or may be supported on vehicles such as railway cars or trailers. Bulk materials are contained in the hoppers and are discharged either by gravity or by pneumatic unloading means which will include conduits for conveying the discharge material to receiving bins or other vehicles.

Description of the prior art

In the prior art combination gravity and pneumatic gates have been provided which will permit the discharge of material from a hopper either by gravity or by suction such as afforded by pneumatic conveying means. In certain designs a gravity gate is provided which when moved to an open position relative to the discharge hopper, will permit the gravity discharge of material. In the event that pneumatic discharge is desired in these devices, they are provided with a pan over the discharge opening underneath the gravity gate, the said pan being provided with a conduit for exhausting air and material from the hopper. Other designs have been provided wherein a pneumatic hood has been disposed in the discharge chamber beneath the hopper discharge outlet immediately above the gravity gate. In constructions of this type the hood is permanently fixed above the gravity gate and in its closed position pneumatic discharge is effected. However the fixed hood will tend to obstruct the flow of material through the outlet chamber when the gate has been opened for the gravity discharge of materials.

SUMMARY

The invention relates to a combination pneumatic and gravity gate for discharging materials from a hopper wherein the movable gravity gate includes a pneumatic hood fixed to and movable with the gate to a closed position and wherein the hood is connected to a pneumatic conveying means including an air and material exhaust duct. The gravity gate when moved to an open position carries with it the hood which in said position is disposed entirely out of the discharge chamber to an out-of-the-way position permitting the free discharge of material from the hopper by means of gravity.

BRIEF DESCRIPTION OF THE DRAWINGS

FIG. 1 is a perspective view of a combination pneumatic and gravity gate;
FIG. 2 is a cross sectional view through the gate taken along the line 2—2 of FIG. 1;
FIG. 3 is a cross sectional view taken substantially along the line 3—3 of FIG. 1;
FIG. 4 is a perspective view of a first modified combination pneumatic and gravity gate arrangement;
FIG. 5 is a cross sectional view of the gate taken substantially along the line 5—5 of FIG. 4;
FIG. 6 is a cross sectional view taken substantially along the line 6—6 of FIG. 4;
FIG. 7 is a perspective view of a second modified combination pneumatic and gravity gate;
FIG. 8 is a cross sectional view taken substantially along the line 8—8 of FIG. 7;
FIG. 9 is a cross sectional view taken substantially along the line 9—9 of FIG. 7;
FIG. 13 is a perspective view of a pneumatic gravity gate showing a fourth modified arrangement;
FIG. 14 is a cross sectional view taken substantially along the line 14—14 of FIG. 13;
FIG. 15 is a cross sectional view taken substantially along the line 15—15 of FIG. 13;
FIG. 16 is a perspective view of a fifth modified combination pneumatic and gravity gate arrangement;
FIG. 17 is a cross sectional view taken substantially along the line 17—17 of FIG. 16;
and
FIG. 18 is a cross sectional view taken substantially along the line 18—18 of FIG. 16.

DESCRIPTION OF THE PREFERRED EMBODIMENT

Figure 10:
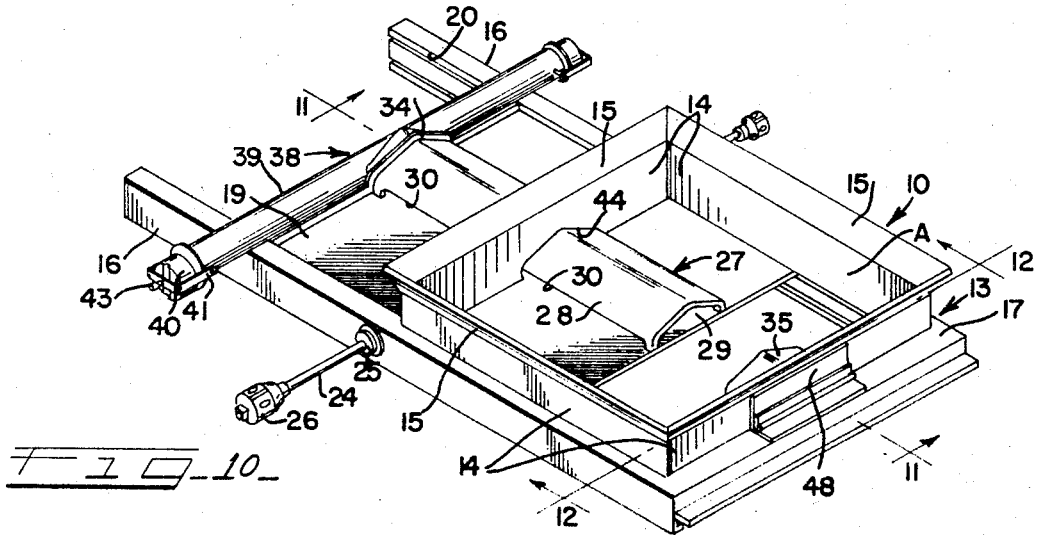
FIG. 10 is a perspective view of a third modified combination pneumatic and gravity gate.

Referring particularly now to FIGS. 1, 2 and 3 a combination pneumatic and gravity discharge gate for hoppers is generally designated by the reference character 10. The gate 10 is suitably connected to a hopper 11 which in turn forms part of a railway hopper car or other vehicle, or stationary bin, which is to be unloaded by gravity or pneumatic conveying means. The hopper 11 comprises four converging walls 12 providing at their lower edges a substantial rectangular discharge opening. The gate 10 comprises a substantially horizontal frame 13 including a plurality of upright walls 14 suitably connected in rectangular configuration, each of said walls 14 being provided with converging wall portions 15 at their upper ends which suitably are connected to the four converging walls 12. The upright walls 14 comprises a discharge chamber A provided immediately below the lower edges of the four converging walls 12 of the hopper. The discharge chamber A is supported by horizontally spaced and horizontally extending side frame members 16 suitably connected to a transversely extending front frame member 17 and a rear transversely extending frame member 18. A gate or closure member 19 is slidably supported on the side frame members 16 by means of longitudinally extending slots forming tracks 20 on said side frame members 16. In the closed position of the gate 19 the front edge of said gate is disposed in a recess 21 provided in the front frame member 17 whereupon the gate 19 closes the discharge chamber A.

The gate 19 is provided on its lower surfaces with a plurality of rack teeth 22 on a rack bar which are suitably engaged by means of pinions 23, one of which is rotatably disposed adjacent each side frame member 16 by means of a shaft 24 which is suitably journalled, as indicated at 25, on said side frame members 16. The shaft 24 has connected thereto an operating head 26 which is adapted to be engaged by means of a bar in the hands of an operator whereupon rotation of the bar the shaft 24 pivots the pinions 23 thereby effecting movement of the gate 19 either to a closed or open position relative to the discharge chamber A.

Hood means supported on the gate 19 is generally referred to by the reference character 27. The hood means 27 includes a hood element 28 centrally supported on the gate 19 and being of a U or V shaped design disposed on said gate 19 in an inverted position. The hood element 28 is open at its end as indicated at 29 and on opposite sides thereof has lower edges spaced above the gate 19 to provide a plurality of material intake openings indicated at 30.

As best shown in FIG. 2 the hood 28 at its rear end is provided with a valve plate 31 which by means of a hinge 32 supported on the gate 19 closes a rear opening 33 on the hood element 28. The valve plate 31 may be hinged opposite from the position shown for venting the rear opening 33 for the intake of air.

As best shown in FIG. 1 the rear wall 14 is provided with an opening 44 of the same shape and substantially the same size as the hood element 28 so that during sliding movement of the gate 19 the hood element 28 passes through the opening 44. The flange 34 in the closed position as shown in FIG. 2 is arranged to substantially seal the opening 44 when the gate is used for pneumatic discharge.

As best shown in FIG. 2 the front wall 14 opposite to the rear wall 14 is provided with a stub hood 35 which extends through an opening 35¹ provided in the front wall 14. The stub hood 35 need not project into the chamber A, as shown, as long as it communicates with the hood element 28 to properly convey materials from the chamber A. The opening 35¹ may serve as the cooperating and hood connecting means which achieves this purpose. In the closed position of the gate 19, the stub hood 35 being of the same general shape as the opening 29 and of somewhat smaller dimension, telescopes into said opening 29 providing a substantial sealed connection relative to material disposed in the hopper for discharge. The opening 36 thus provides for communication of the stub hood 35 with the interior of the hood element 28.

A projecting section 37 of the stub hood 35 is connected to a pneumatic conveying means generally designated at 38. The pneumatic conveying means 38 comprises an air and material exhaust duct 39 which is provided at opposite ends, as best shown in FIG. 3 with closure caps 40 removably positioned relative to the said duct 39. Each closure cap is held in closed position by means of a U shaped bracket 41 hingedly connected at 42 to the duct 39. The caps 40 are held in the closed position by means of the pressure exerted by a hand screw 43 rotatably mounted on the U shaped bracket 41.

As best shown in FIGS. 2 and 3, the frame member 18 is provided with a track 45 and the frame members 16 are provided with tracks 45¹ which if desired may support a sanitary pan that may be slidably positioned in a closed position underneath the discharge chamber A to prevent the possibility of contaminants becoming lodged underneath the closure gate 19 and which may become intermixed with material that is being discharged. Such a sanitary gate is conventional and is not shown in the drawings.

THE OPERATION

Assuming that the combination pneumatic and gravity gate 10 is connected to the hopper of a tank or hopper car containing materials to be unloaded by gravity the gate 19 is moved from the closed position of FIG. 2 to a completely open position by rotation of the operating head 26 and shaft 24 wherein the gate 19 is positioned completely in an out-of-the-way or laterally removed position relative to chamber A. Obviously now the hood element 28 also being positioned in an out-of-the-way position the material may be discharged by means of gravity through the opening provided. The stub hood 35 is sufficiently short so as to provide a minimum of obstruction for the gravity discharge material.

In the event that the shipment of material which, generally may be of granular or powder form, is to be discharged by pneumatic conveying means, either to another vehicle or stationary bin the gate 19 is moved to the closed position shown in FIG. 2. The valve element 31 is now folded downwardly from the position shown in FIG. 2 whereupon the opening 33 permits air to enter into the hood element 28. Depending now from which end of the duct 39 material is to be exhausted one of the caps 40 is removed and hooked up to a conduit connected to a source of vacuum. The material within the hopper is received on the gate 19 and from there is conveyed through the openings 30 into the interior of the hood element 28 whereupon it is discharged through the stub hood 35 to the duct or conduit 39 and outwardly therefrom to its ultimate point of destination.

Thus it is apparent that the improved combination pneumatic and gravity gate permits either the discharge of material by gravity or the same gate which opens the chamber A for the discharge by gravity may be moved to a closed position carrying the hood element 28 with it whereupon pneumatic discharge can be effected as described. Thus either operation may be performed with the utilization of a minimum of parts and since the hood 28 is removable with the gate 19 the chamber A is free of obstructions compared to an arrangement wherein the hood is firmly fixed in place as indicated above in prior art devices. During the movement of the gate 19 to its open position, any residue of material will be scraped therefrom by the wall portion surrounding the opening 44, to thus clean the gate.

MODIFICATIONS OF THE CONSTRUCTION

The following are modifications of the construction shown in FIG. 1. In these modifications like parts are designated by the same reference characters as the embodiment shown in FIGS. 1, 2 and 3.

In the first modification shown in FIGS. 4, 5 and 6, the gate 19 is provided with a plurality of hood elements 28 which are engageable with stub hoods 35. The operation is substantially the same as that above described for FIGS. 1 through 3, the discharge of materials during the pneumatic operation being of course much more rapid because of the additional capacity provided by the double hood construction.

The second modification shown in FIGS. 7, 8 and 9 is substantially similar to the design in FIGS. 1 through 3 with the exception that the valve plate 31 and associated parts have been removed and in turn a second conduit or duct 46 is communicatively connected to the opening 33 of the hood element 28.

In the operation in this modification the cap 40 of the duct 39 may be removed and attached to a source of vacuum whereupon one of the caps 40 of the duct 46 may be removed permitting air to enter through the duct 46 into the hood element 28 and suction through the duct 39 provides for the discharge of material in the same manner as the disclosure shown in FIG. 1. It is of course apparent that the suction source or vacuum may be also attached to the duct 46 whereupon the duct 39 then serves to provide for the entrainment of air into the chamber A.

Figure 11:
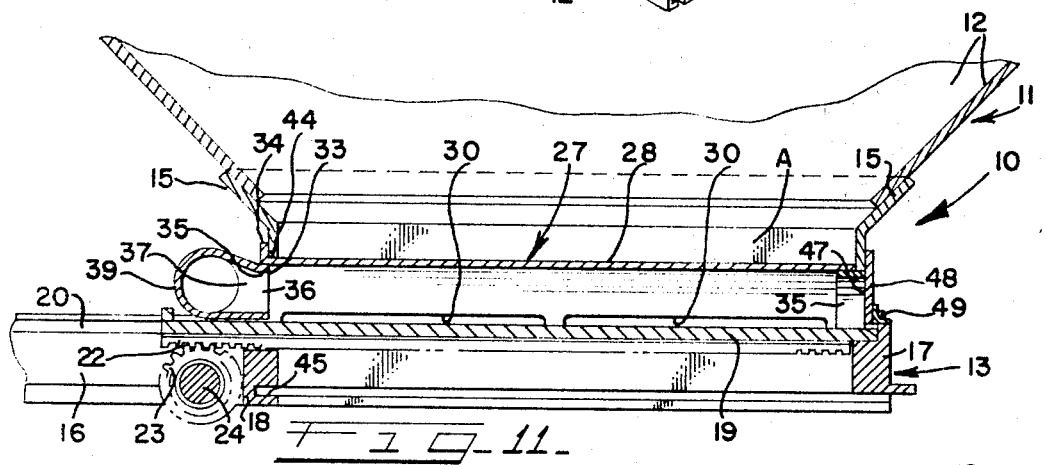
FIG. 11 is a cross sectional view taken along the line 11—11 of FIG. 10.
Figure 12:
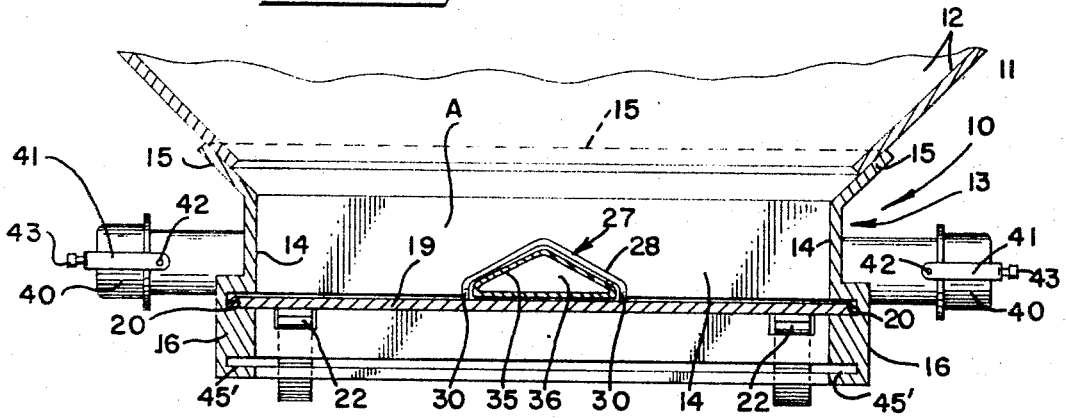
FIG. 12 is a cross sectional view taken substantially along the line 12—12 of FIG. 10.

In the third modification shown in FIGS. 10, 11 and 12 the air and material exhaust duct 39 is connected to the hood element 28 to communicate through the rear opening 33. In this construction the stub hood 35 consists only of a short section extending into the chamber A through one front wall 14 and the said stub hood 35 is closed by means of a valve plate 47 connected to a hinge element 48 in turn hingedly supported by means of a hinge 49 on the front frame member 17.

In the operation of this modification one of the caps 40 is removed and the conduit 39 is attached to a source of suction. The element 48 and valve plate 47 are rotated outwardly from the stub hood 35 permitting the same to have communication with the air to effect operation and removal of material in the same manner as above indicated.

In the fourth modification shown in FIGS. 13, 14 and 15 the hood element 28 is of the same shape as indicated in the aforementioned modifications. In this particular disclosure however the hood element 28 extends substantially completely across the chamber A although being spaced from the side frame members 16 as best shown in FIG. 15 to permit material to be drawn into the hood element 28 through the openings 30. The opening 44 is of course of substantially the same size and shape as the hood element 28 employed in this modification. The stub hood 35 also is of a shape substantially complementing the shape of the hood element 28 so that in the closed position of the gate 19 the hood element 28 and stub hood 35 are in telescopic engagement in the same manner as shown in the above modifications and in the preferred embodiment. In this particular case however as shown in FIG. 14 the combination pneumatic and gravity gate is mounted in an inclined position conforming to the inclination of the hopper 11. In this manner material being discharged from the hopper 11 also is guided in the direction of movement provided by the uncapping of the pneumatic conveying means 38 which is connected to a source of suction.

In the fifth modification shown in FIGS. 16, 17 and 18 the opening 33 in the rear wall 14 extends substantially the length thereof and the hood element 28 is positioned diagonally across the gate 19. The stub hood 35 is positioned at a corner of the front wall 14 to be in telescoping engagement with respect to the diagonally positioned hood element 28. A closure member 49 is connected to the gate 19 and extends about the outer peripheral surface of the hood element 28 so as to completely close the opening 33 when the gate 19 is moved to the closed position. In this particular modification the hinged valve plate 31 is also supported on the gate 19 in back of the closure member 49 for alternately closing and opening the rear opening 33 of the hood element 28.

It is apparent here that in the operation it again is only necessary to uncap the exhaust duct 39, open the hinged valve 32 and connect the exhaust duct to a suitable source of vacuum whereupon pneumatic unloading can be effected.

The foregoing description and drawings are given to explain and illustrate the invention, and the invention is not to be limited thereto, as those skilled in the art who have the disclosure before them will be able to make modifications and variations therein without departing from the scope of the invention.

What is claimed is:

1. An outlet arrangement for attachment to the discharge end of a hopper comprising:
   a frame adapted to be mounted adjacent to said discharge end, said frame including a chamber adapted to receive and discharge material from said hopper,
   a closure member movably positioned on said frame for movement between a position closing said chamber and an open position,
   a pneumatic hood element supported on said closure member for movement therewith, said hood element being disposed within said chamber during the closed position of said closure member, and being removable from said chamber during the open position of said closure member,
   said hood element having opening means communicating within said chamber,
   pneumatic conveying means carried by said frame, being disposed outside said chamber, the hood element being movable relative to said pneumatic conveying means, the hood element in the closed position of the closure member registering with the pneumatic conveying means for communication therewith and pneumatically withdrawing material from the chamber, the hood being moved out of registry with the pneumatic conveying means in the open position of the closure member for preventing withdrawal of material from the chamber,
   air intake means for said hood element, and
   means for moving said closure member to said open position whereby material in said chamber may be discharged by gravity.

2. An outlet arrangement for the discharge end of a hopper comprising:
   a frame including vertical walls connected to and being substantially coextensive with said discharge end, said walls providing a chamber adapted to receive and discharge material from said hopper,
   a closure member movably positioned on said frame for movement between a position closing said chamber and an open position,
   pneumatic hood means supported on said closure member for movement therewith, said hood means being disposed within said chamber during the closed position of said closure member, and being removable with said closure member from said chamber during the open position of said closure member,
   said hood means having opening means communicating within said chamber,
   pneumatic conveying means carried by said frame and disposed outside said chamber, the hood means being movably relative to said pneumatic conveying means, the hood means in the closed position of the closure member registering with the pneumatic conveying means for communication therewith and pneumatically withdrawing material from the chamber, the hood being moved out of registry with the pneumatic conveying means in the open position of the closure member for preventing withdrawal of the material from the chamber,
   air intake means for said hood means, and
   means for moving said closure member to said open position whereby material in said chamber is discharged by gravity.

3. An outlet arrangement in accordance with claim 2, said closure member being slidingly supported on said frame for movement into said closed position underneath said chamber and said discharge end, and for movement horizontally to one side of said chamber.

4. An outlet arrangement in accordance with claim 3, said pneumatic conveying means comprising air and material exhaust duct means.

5. An outlet arrangement in accordance with claim 3, one of said walls having an opening generally conforming to the size and shape of said inverted hood means, said hood means during sliding movement of said closure member being movable through said opening.

6. An outlet arrangement in accordance with claim 5, said hood means having an open end disposed within said chamber in the closed position,
hood communicating means carried by a wall opposite to said first wall,
said open end and hood communicating means being adapted to be connected communicatively in relatively sealed relation during the closed position of said closure member.

7. An outlet arrangement in accordance with claim 6, said hood communicating means including a stub hood, and
means communicatively connecting said stub hood with said duct means.

8. An outlet arrangement in accordance with claim 5, said duct means being connected to said closure member for movement therewith.

9. An outlet arrangement in accordance with claim 8, said closure member moving means including a rack connected thereto, and pinion means positional laterally of said chamber engaging said rack, said pinion means being positioned between said duct and said chamber.

10. An outlet arrangement in accordance with claim 7, said duct means including a first duct connected to said stub hood, and a second duct connected to said hood means, said second duct being slidable with said closure member.

11. An outlet arrangement in accordance with claim 2, said hood means comprising a plurality of hood elements, a plurality of stub hoods supported on said frame and extending into said chambers, said hood elements having open ends and said stub hoods having open ends sealingly engageable with each other during the closed position of said closure member.

12. An outlet arrangement in accordance with claim 11, said conveying means including an air and material exhaust duct connected to and communicating with said stub hoods and said hood elements.

13. An outlet arrangement in accordance with claim 11, one of said walls having a plurality of openings conforming in shape and size substantially to the shape of said hood elements, said hood elements being movable through said openings into said chamber, and said stub hoods being supported on a wall opposite to said first wall.

14. An outlet arrangement for the discharge end of a hopper comprising:
  a frame including vertical walls connected to and being substantially coextensive with said discharge end, said walls providing a chamber adapted to receive and discharge material from said hopper,
  a closure member movably positioned on said frame for movement between a position closing said chamber and an open position,
  pneumatic hood means supported on said closure member for movement therewith, said hood means being disposed within said chamber during the closed position of said closure member and being removable with said closure member from said chamber during the open position of said closure member,
  said hood means having opening means communicating within said chamber,
  one of said walls having an opening, said hood means being movable through said opening to said positions,
  pneumatic conveying means carried by said frame and disposed outside said chamber,
  said conveying means communicating with said hood means and in the closed position pneumatically withdrawing material from said chamber,
  air intake means for said hood means, and
  means for moving said closure member to said open position whereby material in said chamber is discharged by gravity.

15. An outlet arrangement for the discharge end of a hopper in accordance with claim 14,
  said closure member including closure means for closing said opening in the closed position of said closure member.

16. An outlet arrangement in accordance with claim 14,
  said hood means including a hood element containing said opening means and extending substantially the width of said chamber,
  a stub hood projecting into said chamber and conforming substantially to the shape of said hood element,
  said stub hood having an open end sealingly engaging said open end of said hood element in the closed position of said closure member, and
  said frame being positioned in inclined relation with said hopper.

17. An outlet arrangement in accordance with claim 14,
  one of said walls including an opening extending substantially coextensive the width of said chamber,
  said hood means extending diagonally across said chamber,
  a stub hood supported on a wall opposite said first wall and including an open end sealingly engageable with the opening means of said hood in the closed position, and
  closure means on said closure member for closing said opening in said wall during said closed position.

18. An outlet arrangement in accordance with claim 14, wherein the wall opposite to said first wall is provided with an opening,
  said opening providing for the communication of said hood means with said conveying means.

References Cited

UNITED STATES PATENTS

| | | | |
|---|---|---|---|
| 2,393,932 | 1/1946 | Petroe | 302—52 |
| 2,926,963 | 3/1960 | Dorey | 302—52 |
| 3,316,030 | 4/1967 | Kemp | 302—52 |
| 3,360,302 | 12/1967 | Bagguley | 302—53 |
| 3,373,884 | 3/1968 | Dorey | 302—52 |

ANDRES H. NIELSEN, *Primary Examiner.*